United States Patent
Höcht et al.

(10) Patent No.: US 12,474,426 B2
(45) Date of Patent: Nov. 18, 2025

(54) MAGNETIC RESONANCE ELASTOGRAPHY APPARATUS

(71) Applicant: Siemens Healthineers AG, Forchheim (DE)

(72) Inventors: Philipp Höcht, Bavaria (DE); Manuel Stich, Parkstein (DE)

(73) Assignee: Siemens Healthineers AG, Forchheim (DE)

( * ) Notice: Subject to any disclaimer, the term of this patent is extended or adjusted under 35 U.S.C. 154(b) by 155 days.

(21) Appl. No.: 18/232,428

(22) Filed: Aug. 10, 2023

(65) Prior Publication Data

US 2024/0053422 A1    Feb. 15, 2024

(30) Foreign Application Priority Data

Aug. 12, 2022    (EP) ..................... 22190144

(51) Int. Cl.
*G01R 33/42*    (2006.01)
*A61B 5/00*    (2006.01)
(Continued)

(52) U.S. Cl.
CPC ...... *G01R 33/56358* (2013.01); *A61B 5/0051* (2013.01); *A61B 5/055* (2013.01); *G01R 33/422* (2013.01)

(58) Field of Classification Search
CPC .............. G01R 33/00; G01R 33/422; G01R 33/56358; G01R 33/243; G01R 33/443;
(Continued)

(56) References Cited

U.S. PATENT DOCUMENTS

| | | | |
|---|---|---|---|
| 2009/0299168 A1* | 12/2009 | Ehman | A61B 5/0051 600/410 |
| 2015/0148663 A1* | 5/2015 | Vernickel | G01R 33/5608 600/422 |

(Continued)

FOREIGN PATENT DOCUMENTS

| | | | |
|---|---|---|---|
| EP | 3736594 A1 | 11/2020 | |
| JP | 2002010991 A * | 1/2002 | G01R 33/30 |

OTHER PUBLICATIONS

Loew, Wolfgang et al: "A Dedicated 3 Tesla 1-3,5-9 Prostate Coil for Magnetic Resonance Elastography, Imaging, and Tracking", Proceedings of The International Society For Magnetic Resonance In Medicine, ISMRM, Joint Annual Meeting ISMRM-ESMRMB, Milan, Italy, May 10-16, 2014, Nr. 2180, Apr. 25, 2014 (Apr. 25, 2014), XP040663249.

(Continued)

*Primary Examiner* — Jermele M Hollington
*Assistant Examiner* — Taqi R Nasir
(74) *Attorney, Agent, or Firm* — Banner & Witcoff Ltd.

(57) ABSTRACT

A magnetic resonance elastography apparatus, which may include a magnetic resonance apparatus and an elastography apparatus, is described. The magnetic resonance apparatus comprises a scanner unit, a patient receiving region surrounded at least partially by the scanner unit, and a patient couch, which is embodied to introduce a patient into the patient receiving region. The elastography apparatus comprises a drive unit, a vibration applicator which is arranged for an examination on the patient, and a force transmission unit, which is embodied to transmit a drive moment from the drive unit to the vibration applicator. The elastography apparatus comprises an EMC-tight shield housing with a cylindrical radiofrequency hollow conductor, and the drive unit is arranged within the radiofrequency hollow conductor.

12 Claims, 2 Drawing Sheets

(51) Int. Cl.
*A61B 5/055* (2006.01)
*G01R 33/422* (2006.01)
*G01R 33/563* (2006.01)

(58) Field of Classification Search
CPC ............ G01R 33/0035; G01R 33/0023; G01R 33/0017; G01R 31/3191; G01R 33/0358; G01R 33/0356; A61B 5/0051; A61B 5/055; G01B 7/004; G01C 17/38; G06F 3/017; G06F 3/0346; G06F 3/012; H01L 39/223
See application file for complete search history.

(56) References Cited

U.S. PATENT DOCUMENTS

| | | | |
|---|---|---|---|
| 2018/0292501 A1* | 10/2018 | Neumann | B06B 1/186 |
| 2020/0355762 A1 | 11/2020 | Kreher et al. | |
| 2023/0296708 A1* | 9/2023 | Annio | A61B 5/0046 600/411 |

OTHER PUBLICATIONS

Chen, Qite et al: "The Design of Shear Wave Drive Device in Magnetic Resonance Elastography", Bioinformatics and Biomedical Engineering, (ICBBE) 2011 5th International Conference on, IEEE, May 10, 2011 (May 10, 2011), pp. 1-4, XP031878910, DOI: 10.1109/ICBBE.2011.5780456 ISBN: 978-1-4244-5088-6.

* cited by examiner

MAGNETIC RESONANCE ELASTOGRAPHY APPARATUS

CROSS-REFERENCE TO RELATED APPLICATIONS

The present application claims priority to and the benefit of Europe patent application no. EP 22190144.0, filed on Aug. 12, 2022, the contents of which are incorporated herein by reference in their entirety.

TECHNICAL FIELD

The present disclosure relates to a magnetic resonance elastography apparatus with a magnetic resonance apparatus and an elastography apparatus.

BACKGROUND

Tumor tissue and healthy tissue, in particular tissue which is free from tumors, have different vibration characteristics and/or a different excitation behavior during a vibration excitation. In elastography, diagnostic imaging uses the different vibration characteristics and/or the different excitation behavior between the different tissue types, in particular a healthy tissue and a tumor tissue. This different behavior can be represented in a magnetic resonance elastogram by means of magnetic resonance imaging and used for diagnosis.

During a magnetic resonance elastography examination, with a generation of a drive moment of the elastography apparatus, unwanted disturbances and/or interferences with a radio frequency antenna unit of the magnetic resonance apparatus can occur.

SUMMARY

The object underlying the present disclosure is directed to an elastography apparatus, which can be operated without disturbances together with a magnetic resonance apparatus. The object is achieved by the features of the embodiments as described herein, including the claims.

The disclosure is based on a magnetic resonance elastography apparatus with a magnetic resonance apparatus and an elastography apparatus, wherein the magnetic resonance apparatus comprises:
  a scanner unit,
  a patient receiving region surrounded at least partially by the scanner unit, and
  a patient couch, which is embodied to introduce a patient into the patient receiving region,
  wherein the elastography apparatus comprises:
  a drive unit,
  a vibration applicator, which is arranged on the patient for a magnetic resonance elastography examination, and
  a force transmission unit, which is configured to transmit a drive moment from the drive unit to the vibration applicator.

In accordance with the disclosure, the elastography apparatus comprises an electromagnetic compatibility (EMC)-tight shield housing with a cylindrical radiofrequency hollow conductor (RF hollow conductor), wherein the drive unit is arranged within the radiofrequency hollow conductor.

The magnetic resonance apparatus may comprise for instance a medical and/or diagnostic magnetic resonance apparatus, which is configured and/or implemented to capture medical and/or diagnostic image data, e.g. medical and/or diagnostic magnetic resonance image data, from an object such as a patient. A scanner unit of the magnetic resonance apparatus may comprise for instance a detector unit, e.g. a magnet unit, for capturing the medical and/or diagnostic image data, e.g. magnetic resonance image data. Here said scanner unit, e.g. the magnet unit, comprises a main magnet, a gradient coil unit, and a radiofrequency antenna unit. In this regard, the radiofrequency antenna unit is fixedly arranged inside the scanner unit. Moreover, the magnetic resonance apparatus can also comprise local radiofrequency coils, which are arranged around the region of a patient to be examined to capture magnetic resonance data.

The main magnet is configured to produce a homogeneous main magnetic field of a defined magnetic field strength, for instance a magnetic field strength of 0.55 T, 1.5 T, 3 T, 7 T or greater, etc. In an embodiment, the main magnet is configured to generate a strong, constant, and homogeneous main magnetic field. The homogeneous main magnetic field may be located and/or situated within a patient placement region of the magnetic resonance apparatus. The gradient coil unit is configured to produce magnetic field gradients, which are used for spatial encoding during imaging.

For a magnetic resonance examination, an object, e.g. the patient or the region of interest of the patient, is positioned within a patient receiving region of the magnetic resonance apparatus. The patient receiving region is surrounded at least partially by the scanner unit, e.g. surrounded cylindrically by the scanner unit. A field of view (FOV) and/or an isocenter of the magnetic resonance apparatus may be e.g. arranged and/or located within the patient receiving region. The FOV may comprise a capture region of the magnetic resonance apparatus within which the conditions exist for a capture of medical image data, e.g. magnetic resonance image data, within the patient receiving region, for example a homogeneous main magnetic field. The isocenter of the magnetic resonance apparatus may comprise the region and/or point inside the magnetic resonance apparatus that has the optimum and/or ideal conditions for capturing medical image data, e.g. magnetic resonance image data. The isocenter comprises the most homogeneous magnetic field region inside the magnetic resonance apparatus.

For a positioning of the patient, e.g. of the region of the patient to be examined, within the patient receiving region, the magnetic resonance apparatus has a patient couch, which is configured to be movable within the patient receiving region of the magnetic resonance apparatus. For a magnetic resonance examination, the patient is firstly positioned on the patient couch of the patient positioning apparatus and subsequently the patient couch is moved together with the patient into the patient receiving region, until the region of the patient to be investigated is positioned within the isocenter.

The drive unit of the elastography apparatus is configured to generate a drive moment, which may be e.g. transmitted to the vibration applicator. The drive unit can to this end have a motor unit, for instance a stepper motor. Moreover, the drive unit can also have a motor control unit.

The vibration applicator of the elastography apparatus is configured to generate vibrations and/or compression waves, and to transmit the generated vibrations and/or compression waves to the patient and/or onto the patient. Here, the vibration applicator may be e.g. positioned in the vicinity of the patient, such as e.g. in the vicinity of the region of the patient to be examined. Here, for example, the vibration applicator is held against the region of the patient to be examined During a magnetic resonance elastography examination, the vibration applicator is thus located within the patient receiving region, e.g. within the FOV.

The force transmission unit has a force transmission element, which may be e.g. implemented to be magnetic resonance compatible, so that during a magnetic resonance elastography examination no disturbances are caused by the force transmission unit. The force transmission element may comprise a magnetic resonance compatible shaft, e.g. a flexible shaft, so that a simple and flexible arrangement of the vibration applicator with respect to the drive unit is possible.

The EMC (electromagnetic compatibility)-tight shield housing prevents an unwanted interaction between the drive unit and the scanner unit, e.g. the radiofrequency antenna unit of the scanner unit, of the magnetic resonance apparatus. An EMC-tight shield housing has the property of shielding unwanted electrical or electromagnetic effects. For example, in this way electrical or electromagnetic effects of the drive unit of the elastography apparatus can advantageously be shielded. The cylindrical RF hollow conductor may e.g. comprise a circular and/or round cross-section. In this regard, the RF hollow conductor may be e.g. advantageously implemented to be rotationally symmetrical with respect to a longitudinal axis, which may run through a center of the RF hollow conductor.

The disclosure is advantageous in that the elastography apparatus can be operated without disturbance with the magnetic resonance apparatus for a magnetic resonance elastography examination. This also permits a simple integration of the elastography apparatus with a magnetic resonance apparatus. Moreover, the drive unit can be positioned at any location in the surroundings of the magnetic resonance apparatus by means of the EMC-tight shield housing. Furthermore, this embodiment of the disclosure has the advantage that a simple geometric embodiment of the RF hollow conductor has an advantageous filtering effect and/or shielding. For instance, in this regard the RF hollow conductor can be used to achieve an advantageous damping of electromagnetic waves and thus to prevent an unwanted interaction between the elastography apparatus, e.g. the drive unit of the elastography apparatus, and the magnetic resonance apparatus.

In an advantageous development of the inventive magnetic resonance elastography apparatus, provision can be made for the drive unit to have a motor control unit, wherein the motor control unit is arranged within the EMC-tight shield housing. The motor control unit may be e.g. configured to control the motor, for instance a stepper motor, of the elastography apparatus. Moreover, the motor control unit can also be coupled to the magnetic resonance apparatus to enable a data exchange between the magnetic resonance apparatus and the elastography apparatus, for instance during a magnetic resonance elastography examination. This embodiment has the advantage that a particularly compact arrangement of the entire drive unit within the EMC-tight shield housing is enabled.

In an advantageous development of an embodiment of the magnetic resonance elastography apparatus, provision can be made for the drive unit together with the EMC-tight shield housing to be arranged outside of the patient receiving region. In an embodiment, the drive unit together with the EMC-tight shield housing is arranged outside of the patient receiving region during a magnetic resonance elastography examination. Here, the drive unit together with the EMC-tight shield housing can be arranged and/or positioned at a foot end of the patient couch, for instance. Moreover, the drive unit together with the EMC-tight shield housing can also be arranged adjacent to the patient couch during a preparation of the patient and/or the magnetic resonance elastography examination and also remain there during the magnetic resonance elastography examination. This embodiment of the disclosure has the advantage that during a magnetic resonance elastography examination, sufficient space is available for the patient within the patient receiving region.

In an advantageous development of an embodiment of the magnetic resonance elastography apparatus, provision can be made for the radiofrequency hollow conductor to comprise a length and a diameter, wherein a ratio of the length to the diameter is matched to an oscillation spectrum produced by the drive unit. By means of this embodiment, an advantageous damping of electromagnetic waves can be achieved, and thus also an unwanted interaction prevented between the elastography apparatus and the magnetic resonance apparatus.

In an advantageous development of an embodiment of the magnetic resonance elastography apparatus, provision can be made for the radiofrequency hollow conductor to comprise a non-magnetic, metallic tube, as a result of which an advantageous shielding of electromagnetic interference effects can be achieved. The RF hollow conductor may comprise for instance a tube made from aluminum.

In an advantageous development of an embodiment of the magnetic resonance elastography apparatus, provision can be made for the radiofrequency hollow conductor to have two end regions, which are arranged on opposing sides in the longitudinal direction of the radiofrequency hollow conductor, wherein at least one end region of the radiofrequency hollow conductor is embodied to be open. This enables a constructively simple shielding of the drive unit. Moreover, by means of the open embodiment of the RF hollow conductor, a force transmission element, for instance a drive shaft of the force transmission unit can be routed outward by the RF hollow conductor in a particularly easy manner. If the RF hollow conductor is configured to be open at both end regions, the drive unit may be arranged in a center of the RF hollow conductor to achieve effective damping and/or shielding. Here, the drive unit may be arranged within the RF hollow conductor at the same distance from the two end regions. If, by contrast, the RF hollow conductor is configured to be open at only one end region, a length of the RF hollow conductor may be halved compared with an embodiment in which the RF hollow conductor is open at both end regions, to obtain the same damping result and/or shielding result, provided the drive unit is arranged in the region of the closed end region within the RF hollow conductor. Here, the RF hollow conductor can comprise a cover, which closes off the closed end region of the RF hollow conductor. Here, the cover may be fixedly connected to the end region of the RF hollow conductor, such as for instance welded and/or riveted to the end region and/or further fastenings, which appear useful to the person skilled in the art.

In an advantageous development of an embodiment of the magnetic resonance elastography apparatus, provision can be made for the elastography apparatus to comprise a signal transmission unit to transmit signals to the drive unit arranged within the RF hollow conductor, wherein the signal transmission unit comprises at least one fiber optic cable. By means of the signal transmission unit, signals, e.g. data signals, control signals, and/or a voltage supply, may advantageously be made available for the drive unit and/or for a power supply of the drive unit within the RF hollow conductor. The signal transmission unit may be implemented here so that a filtering effect and/or damping effect produced by the RF hollow conductor is not compromised by signal lines of the signal transmission unit, but is instead retained. The at least one fiber optic cable may comprise a glass fiber cable and/or polymer optical waveguides, etc., for instance. The use of fiber optic cables is advantageous in that electrically non-visible cables may be used for signal transmission and/or data transmission. Moreover, it is possible to prevent metallic cable parts from being inserted into the EMC-tight shield housing, e.g. into the RF hollow conductor and, in the process, functioning as antenna, for instance.

In one advantageous development of the magnetic resonance elastography apparatus according to the disclosure, provision can be made for the signal transmission unit to comprise at least one through filter and/or feedthrough filter. By means of the through filter, provision may advantageously be made to supply power to the drive unit and/or further units arranged within the EMC-tight shield housing, e.g. within the RF hollow conductor. The at least one through filter may be e.g. arranged in contact with the RF hollow conductor within the RF hollow conductor, for instance across a shared contact surface.

BRIEF DESCRIPTION OF THE DRAWINGS

Further advantages, features and details of the disclosure result from the exemplary embodiments described below and on the basis of the drawings.

In the drawings.

DETAILED DESCRIPTION OF THE DISCLOSURE

Figure 1:
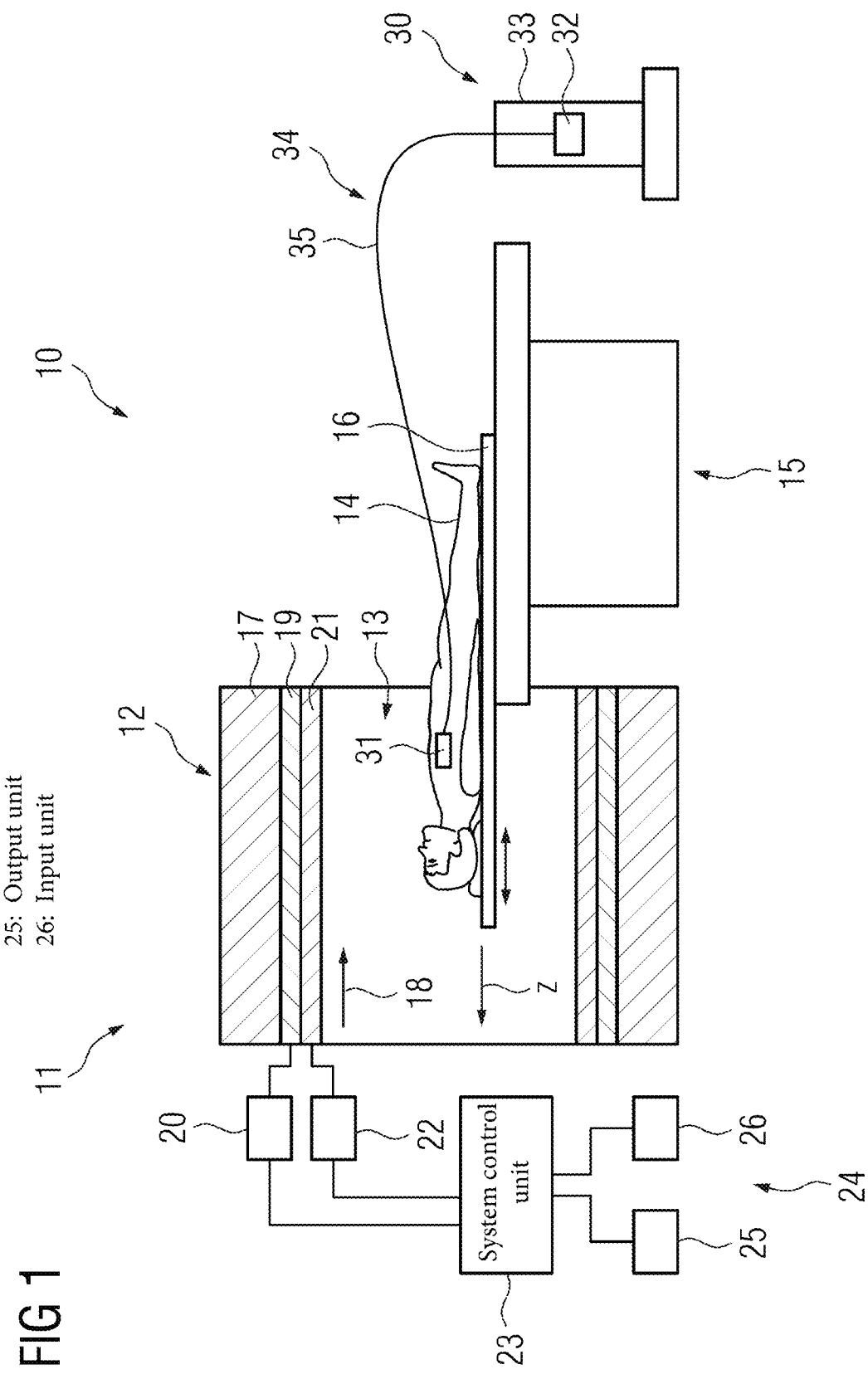
FIG. 1 illustrates an example magnetic resonance elastography apparatus with a magnetic resonance apparatus and an elastography apparatus in a schematic representation, in accordance with one or more embodiments of the present disclosure.

FIG. 1 illustrates a schematic diagram of a magnetic resonance elastography apparatus 10, which is also referred to herein as a magnetic resonance elastography system. The magnetic resonance elastography apparatus 10 comprises a magnetic resonance apparatus 11 (which is also referred to herein as a magnetic resonance device, magnetic resonance imager, or magnetic resonance imaging device) and an elastography apparatus 30 (also referred to herein as an elastography device).

The magnetic resonance apparatus 11 comprises a scanner unit 12 (also referred to herein as a scanner) formed by a magnet unit (also referred to herein as a magnet or main magnet). Moreover, the magnetic resonance apparatus 11 has a patient receiving region 13 for accommodating a patient 14. In the present exemplary embodiment, the patient receiving region 13 is shaped as a cylinder and is enclosed in a circumferential direction cylindrically by the scanner unit 12 by the magnet unit. In principle, however, it is always conceivable that the patient receiving region 13 has a different design. The patient 14 can be moved and/or shifted into the patient receiving region 13 by a patient positioning apparatus 15 of the magnetic resonance apparatus 11. The patient positioning apparatus 15 has for this purpose a patient couch 16, which is configured to be movable inside the patient receiving region 13. For instance, said patient table 16 is mounted such that it can move in the direction of a longitudinal extent of the patient receiving region 13 and/or in the "z-direction."

The scanner unit 12, e.g. the magnet unit, comprises a superconducting main magnet 17 for generating a powerful and constant main magnetic field 18. The scanner unit 12, e.g. the magnet unit, further comprises a gradient coil unit 19 (also referred to herein as gradient coils) for generating magnetic field gradients, which are used for spatial encoding during imaging. The gradient coil unit 19 is controlled by a gradient control unit 20 (also referred to herein as a gradient controller of gradient control circuitry) of the magnetic resonance apparatus 11. The scanner unit 12, e.g. the magnet unit, further comprises a RF antenna unit 21 (also referred to herein as an RF antenna system) for exciting a polarization, which establishes itself in the main magnetic field 18 generated by the main magnet 17. The RF antenna unit 21 is controlled by a radiofrequency antenna control unit 22 (also referred to herein as an RF antenna controller) of the magnetic resonance apparatus 11 and radiates radiofrequency magnetic resonance sequences into the patient receiving region 13 of the magnetic resonance apparatus 11.

The magnetic resonance apparatus 11 has a system control unit 23 (also referred to herein as a system controller, controller, control computer, or computing system) for controlling the main magnet 17, the gradient control unit 20, and the radiofrequency antenna control unit 21. The system control unit 23 centrally controls the magnetic resonance apparatus 11, for example in the execution of a predetermined imaging gradient echo sequence. In addition, the system control unit 23 comprises an analysis unit (also referred to herein as an analyzer or analyzer circuitry, and not presented in further detail) for analyzing medical image data acquired during the magnetic resonance examination.

Furthermore, the magnetic resonance apparatus 11 comprises a user interface 24, which is connected to the system control unit 23. Control data such as imaging parameters, for instance, and reconstructed magnetic resonance images can be displayed and/or output for a medical operator on an output unit 25, for example on at least one monitor, of the user interface 24. In addition, the user interface 24 has an input unit 26, which can be used by the medical operator to enter information and/or parameters during a measurement process.

The elastography apparatus 30 comprises a vibration applicator 31, which has a vibration generator unit (also referred to herein as a vibration generator). During a magnetic resonance elastography examination, the vibration applicator 31 is arranged directly on the patient 14, e.g. on the region of the patient 14 to be examined.

Furthermore, the elastography apparatus 30 has a drive unit 32 (also referred to herein as a driver). The drive unit 32 is configured and/or implemented to produce and/or generate a drive moment for the vibration generator unit during an elastography examination. To avoid interference and/or unwanted interactions between the drive unit 32 and the scanner unit 12, e.g. the radiofrequency antenna unit 21, the elastography apparatus 30 moreover has an EMC-tight shield housing 33, in which the drive unit 32 is arranged. The drive unit 32 is arranged outside of the patient receiving region 13 of the magnetic resonance apparatus 11 during a magnetic resonance elastography examination together with the EMC-tight shield housing 33.

To transmit a drive moment from the drive unit 32 to the vibration applicator 31, the elastography apparatus 30 has a force transmission unit 34 (also referred to herein as a force transmitter). The force transmission unit 34 has at least one force transmission element 35 (also referred to herein as a force transmitter element) that may be implemented for instance as a flexible and magnetic resonance-compatible shaft.

Figure 2:
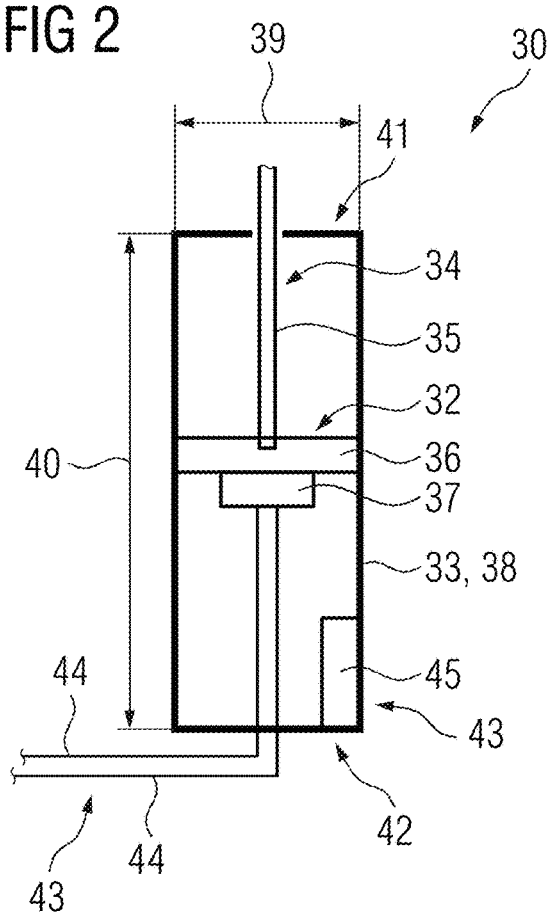
FIG. 2 illustrates a first example of an RF hollow conductor of the elastography apparatus, in accordance with one or more embodiments of the present disclosure.

FIG. 2 illustrates a first exemplary embodiment of the elastography apparatus 30, which includes the drive unit 32 and the EMC-tight shield housing 33 of the elastography apparatus 30, in more detail. The drive unit 32 comprises a motor unit 36 (also referred to herein as a motor or motor assembly), which is implemented for instance as a stepper motor, and a motor control unit 37 (also referred to herein as a motor controller). Both the motor unit 36 and the motor control unit 37 are arranged here within the EMC-tight shield housing 33.

The EMC-tight shield housing 33 comprises a cylindrical radiofrequency hollow conductor (RF hollow conductor 38). The RF hollow conductor 38 comprises a non-magnetic tube. The RF hollow conductor 38, e.g. the tube, has a round and/or circular cross-section. The RF hollow conductor 38 comprises moreover a metallic tube, such as for instance a tube made from aluminum.

To achieve an advantageous shielding and/or damping, the RF hollow conductor 38 has a diameter 39 and a length 40, wherein a ratio of the length 40 to the diameter 39 of the RF hollow conductor 38 is matched to an oscillation spectrum produced by the drive unit 32.

The RF hollow conductor 38 moreover has two end regions 41, 42, which are arranged on opposing sides and/or ends in the longitudinal direction of the RF hollow conductor 38. In the present exemplary embodiment, both end regions 41, 42 of the RF hollow conductor 38 are open. In this exemplary embodiment, the drive unit 32 may be arranged in a center of the RF hollow conductor 38, e.g. at a center in the longitudinal direction of the RF hollow conductor 38, so that as equal a distance as possible exists from both end regions 41, 42 of the RF hollow conductor 38, to ensure an effective damping and/or shielding of electromagnetic waves. The force transmission element 35, e.g. the drive shaft, is guided outward by the RF hollow conductor 38 through a first end region 41 of the two end regions 41, 42.

The elastography apparatus 30 furthermore has a signal transmission unit 43 (also referred to herein as a signal transmitter or transmitter) configured to transmit signals to the drive unit 32 arranged within the RF hollow conductor 38, e.g. to the motor unit 36 and the motor control unit 37. By means of the signal transmission unit 43, advantageously signals, e.g. data signals, control signals, and/or a voltage supply, etc., may be made available for the drive unit 32 and/or for a power supply of the drive unit 32. Here, the signal transmission unit 43 comprises at least one fiber optic cable 44. The at least one fiber optic cable 44 can comprise for instance a glass fiber cable and/or polymer optical waveguides etc. The at least one fiber optic cable 44 is configured to transmit data and/or a supply voltage. The signal transmission unit 43 may also have more than one fiber optic cable 44 for data transmission and/or for voltage supply to the drive unit 32. For instance, two fiber optic cables 44 can be made available for a voltage supply of the drive unit 32.

Furthermore, the signal transmission unit 43 has at least one through filter 45 and/or a feedthrough filter for a current supply, e.g. a current supply to the drive unit 32, e.g. the motor unit 36. The through filter 45 and/or the feedthrough filter is arranged here in contact with the RF hollow conductor 38 within the RF hollow conductor 38. In the present exemplary embodiment, the through filter 45 and/or the feedthrough filter has a contact surface with the RF hollow conductor 38.

Figure 3:
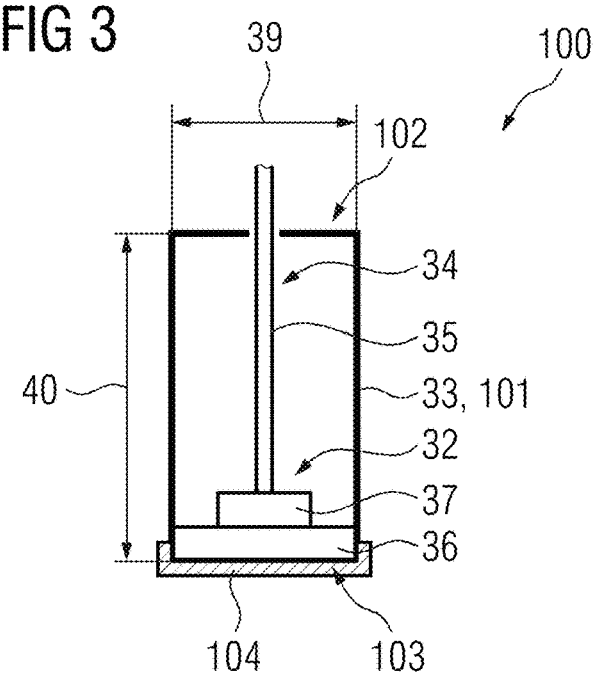
FIG. 3 illustrates a second example of an RF hollow conductor of the elastography apparatus, in accordance with one or more embodiments of the present disclosure.

FIG. 3 shows an alternative exemplary embodiment of the elastography apparatus 100, e.g. an RF hollow conductor 101 of the elastography apparatus 100. In principle, components, features, and functions that are substantially the same are identified with the same reference signs. The following description is essentially restricted to the differences from the exemplary embodiment in FIGS. 1 and 2, wherein with regard to components, features, and functions which remain the same, reference can be made to the description of the exemplary embodiment shown in FIGS. 1 and 2.

The elastography apparatus 100 in FIG. 3 differs from the elastography apparatus 100 in FIG. 2 in an embodiment of the RF hollow conductor 101. A further embodiment of the elastography apparatus 100 corresponds to the embodiments shown and described in relation to FIG. 2.

The elastography apparatus 100 likewise has an RF hollow conductor 101, within which the drive unit 32 is arranged. The RF hollow conductor 101 has two end regions 102, 103, which are arranged on opposing sides and/or ends in the longitudinal direction of the RF hollow conductor 101. In the present exemplary embodiment, only one end region 102 of the two end regions 102, 103 of the RF hollow conductor 101 are open. Here the force transmission element 35, e.g. the shaft, is guided outward by the RF hollow conductor 101 through the open end region 102. By contrast, the further end region 103 of the two end regions 102, 103 is embodied to be closed. Here the closed end region 103 has a cover 104, which is fixedly connected to the end region 103 of the RF hollow conductor 101, such as welded and/or riveted to the end region for instance 103 and/or fastened to the end region 103 by further methods of fastening which appear meaningful to the person skilled in the art.

With an embodiment of the RF hollow conductor 101 of this type, the drive unit 32, e.g. the motor unit 36 and the motor control unit 37, may be arranged in this closed end region 103 of the RF hollow conductor 101. This also enables the RF hollow conductor 101 to only have to have the length required for a shielding and/or damping of electromagnetic waves in one direction.

The further embodiment of the RF hollow conductor 101 and also the signal transmission unit 43 for transmitting the signals and/or data into the RF hollow conductor 101 corresponds here to the embodiments relating to FIG. 2, to which reference is herewith made.

The magnetic resonance elastography apparatuses 10 as shown in FIGS. 1 to 3 may naturally comprise further components that magnetic resonance elastography apparatuses 10 typically have. A general mode of operation of a magnetic resonance elastography apparatus 10 is moreover known to the person skilled in the art, so that a detailed description of the further components is not provided.

Although the disclosure has been illustrated and described in detail by way of the exemplary embodiments, the disclosure is not restricted by the examples disclosed herein, and other variations can be derived therefrom by the person skilled in the art without departing from the protective scope of the disclosure.

The various components described herein may be referred to as "units" or "apparatuses." Such components may be implemented via any suitable combination of hardware and/or software components as applicable and/or known to achieve their intended respective functionality. This may include mechanical and/or electrical components, processors, processing circuitry, or other suitable hardware components, in addition to or instead of those discussed herein. Such components may be configured to operate independently, or configured to execute instructions or computer programs that are stored on a suitable computer-readable medium. Regardless of the particular implementation, such units or devices, as applicable and relevant, may alternatively be referred to herein as "circuitry," "controllers," "processors," or "processing circuitry," or alternatively as noted herein.

What is claimed is:

1. A magnetic resonance elastography system, comprising:
    a magnetic resonance imaging device, comprising:
        a scanner;
        a patient receiving region surrounded at least partially by the scanner; and
        a patient couch configured to move a patient into the patient receiving region;
    a vibration applicator configured to be arranged on the patient for a magnetic resonance elastography examination; and
    an elastography device that is separate from the vibration applicator, the elastography device comprising:
        a driver;
        a force transmitter configured to transmit a drive moment from the driver to the vibration applicator; and
        an electromagnetic compatibility (EMC)-tight shield housing having a cylindrical radiofrequency (RF) hollow conductor,
    wherein the driver is arranged within the RF hollow conductor, and
    wherein the EMC-tight shield housing enables the elastography device to be disposed adjacent to the patient couch during the magnetic resonance elastography examination.

2. The magnetic resonance elastography system as claimed in claim 1, wherein the driver comprises a motor controller, and
    wherein the motor controller is arranged within the EMC-tight shield housing.

3. The magnetic resonance elastography system as claimed in claim 1,
    wherein the driver and the EMC-tight shield housing are arranged outside the patient receiving region.

4. The magnetic resonance elastography system as claimed in claim 1, wherein the RF hollow conductor comprises a non-magnetic and metallic tube.

5. The magnetic resonance elastography system as claimed in claim 1, wherein the RF hollow conductor has two end regions, which are arranged in a longitudinal direction of the RF hollow conductor on opposite sides of one another, and
    wherein at least one end region of the two end regions of the RF hollow conductor is open.

6. The magnetic resonance elastography system as claimed in claim 1, wherein the elastography device further comprises:
    a signal transmitter configured to transmit signals to the driver arranged within the RF hollow conductor, and
    wherein the signal transmitter comprises at least one fiber optic cable.

7. The magnetic resonance elastography system as claimed in claim 6, wherein the signal transmitter comprises at least one through filter.

8. The magnetic resonance elastography system as claimed in claim 7, wherein the at least one through filter is arranged in contact with the RF hollow conductor and within the RF hollow conductor.

9. The magnetic resonance elastography system as claimed in claim 1, wherein the RF hollow conductor has two end regions, which are arranged in a longitudinal direction of the RF hollow conductor on opposite sides of one another, and
    wherein each of the two end regions of the RF hollow conductor is open.

10. The magnetic resonance elastography system as claimed in claim 1, wherein the RF hollow conductor has two end regions, which are arranged in a longitudinal direction of the RF hollow conductor on opposite sides of one another, and
    wherein the driver is disposed in a center of the RF hollow conductor in the longitudinal direction of the RF hollow conductor.

11. The magnetic resonance elastography system as claimed in claim 1, wherein the RF hollow conductor has two end regions, which are arranged in a longitudinal direction of the RF hollow conductor on opposite sides of one another, and
    wherein one end region of the two end regions of the RF hollow conductor comprises an open region that is open, and
    wherein the other one of the two end regions of the RF hollow conductor comprises a closed region that is covered.

12. The magnetic resonance elastography system as claimed in claim 11, wherein the driver is disposed at the closed region of the RF hollow conductor.

* * * * *